United States Patent
Bonfiglioli

(10) Patent No.: US 8,327,690 B2
(45) Date of Patent: Dec. 11, 2012

(54) METHOD AND MACHINE FOR CHECKING THE CONDITION OF CONTAINERS

(75) Inventor: Giuseppe Bonfiglioli, Ferrara (IT)

(73) Assignee: Bonfiglioli Engineering S.R.L. (IT)

( * ) Notice: Subject to any disclaimer, the term of this patent is extended or adjusted under 35 U.S.C. 154(b) by 501 days.

(21) Appl. No.: 12/567,399

(22) Filed: Sep. 25, 2009

(65) Prior Publication Data

US 2010/0077841 A1 Apr. 1, 2010

(30) Foreign Application Priority Data

Sep. 30, 2008 (IT) .............................. BO2008A0596

(51) Int. Cl.
*G01M 3/36* (2006.01)
(52) U.S. Cl. ............................................. 73/49.3; 73/52
(58) Field of Classification Search ................... 73/49.3, 73/52
See application file for complete search history.

(56) References Cited

U.S. PATENT DOCUMENTS

| | | | |
|---|---|---|---|
| 4,899,574 A | | 2/1990 | Potteiger |
| 4,901,558 A | * | 2/1990 | Leining et al. ................. 73/49.3 |
| 5,497,654 A | * | 3/1996 | Lehmann ....................... 73/49.3 |
| 6,167,751 B1 | * | 1/2001 | Fraim et al. .................... 73/49.3 |

FOREIGN PATENT DOCUMENTS

| | | |
|---|---|---|
| EP | 0277458 | 8/1988 |
| JP | 02186232 | 7/1990 |

OTHER PUBLICATIONS

Italian Search Report dated May 29, 2009 from counterpart Italian patent application.

* cited by examiner

*Primary Examiner* — Hezron E Williams
*Assistant Examiner* — Paul West
(74) *Attorney, Agent, or Firm* — Timothy J. Klima; Shuttleworth & Ingersoll, PLC

(57) ABSTRACT

A method for checking the condition of containers (2) comprising a hollow body (5) for containing a semi-liquid or semi-solid product and a membrane (6) for closing the hollow body (5) comprises the steps of: closing the container (2) inside a test head (4) comprising a housing (10) to hold the container (2) and a cap (11) hermetically sealing the container (2) and defining an empty internal space (15); pressurizing the space (15) inside the cap (11) by introduction of pressurized air inside the space (15), for a defined period of time (Ta); releasing the pressurized air from the space (15); measuring the movement of the membrane (6) due to the pressurization of the space (15), by means of a position sensor (14); depressurizing the space (15); measuring the movement of the membrane (6) due to the depressurization of the space (15), using the position sensor (14).

15 Claims, 4 Drawing Sheets

METHOD AND MACHINE FOR CHECKING THE CONDITION OF CONTAINERS

This application claims priority to Italian Patent Application BO2008A000596 filed Sep. 30, 2008, which application is incorporated by reference herein.

BACKGROUND OF THE INVENTION

This invention relates to a method for checking the condition of containers.

In particular, the invention relates to a method for checking the condition of plastic containers containing concentrated products such as, for example, liquids having a high density coefficient, products in the semi-liquid or semi-solid state and the like.

The invention also relates to a test head and a machine for checking the condition of containers of said kind.

As is known, containers of this kind are filled with the product they are designed to contain and then hermetically sealed by applying a membrane.

During packaging and, in particular, during sealing operations, the container may be incorrectly sealed or the sealing membrane may have imperfections in it such as small- or medium sized holes, not detectable by the human eye, or even large-sized holes.

In such cases, the container must be scrapped since the product inside it is not hermetically sealed or adequately protected.

Machines for checking the condition of containers after packaging are known in the prior art. These machines comprise a plurality of bell-shaped test heads designed to isolate the container hermetically and to create a negative pressure (or vacuum) around the container for a defined interval of time.

During this interval of time, when the container is subjected to the negative pressure, the test heads detect whether or not the membrane expands by more than a defined, preset threshold value.

Exceeding the threshold indicates that the container is intact because negative pressure applied to an undamaged container creates a vacuum action that deforms the membrane and causes it to swell.

If the membrane does not swell or the swelling does not exceed the threshold, then the machine tells the operator that the container is not intact.

That is because a hole or sealing defect in the membrane causes the air inside the container to escape to the outside when the negative pressure is applied by the test head to create the vacuum action around the container.

The air extracted from the container compensates the vacuum action of the test head and the membrane either does not swell at all or, at most, swells by an amount less than the threshold.

In that case, the machine indicates that the container does not conform with specifications.

Prior art machines of the above type have some drawbacks.

Especially in the case of containers containing a highly viscous product, a part of the viscous product might find its way into a hole in the membrane as a result, for example, of the container being tilted over during the packaging process.

In that case, the negative pressure created by the test bell does not extract the air from the container because the hole is obstructed by the semi-solid (or semi-fluid) product.

The vacuum action of the test head is not sufficient to remove the product from the hole and the membrane swelling exceeds the set threshold as if the membrane were intact.

Thus, the machine does not detect the hole.

SUMMARY OF THE INVENTION

In this context, the main technical purpose of this invention is to propose a container checking method, test head and machine that overcome the above mentioned drawbacks.

This invention therefore has for an aim to provide a container checking method, test head and machine that are effective and precise irrespective of the type of product inside the container.

The stated technical purpose and aim of the invention are substantially achieved by a container checking method, by a container test head, and by a container checking machine, all as described herein.

BRIEF DESCRIPTION OF THE DRAWINGS

Further characteristics and advantages of this invention are more apparent in the detailed description below, with reference to a preferred, non-limiting, embodiment of a display system as illustrated in the accompanying drawings, in which.

DESCRIPTION OF THE PREFERRED EMBODIMENTS

Figure 1:
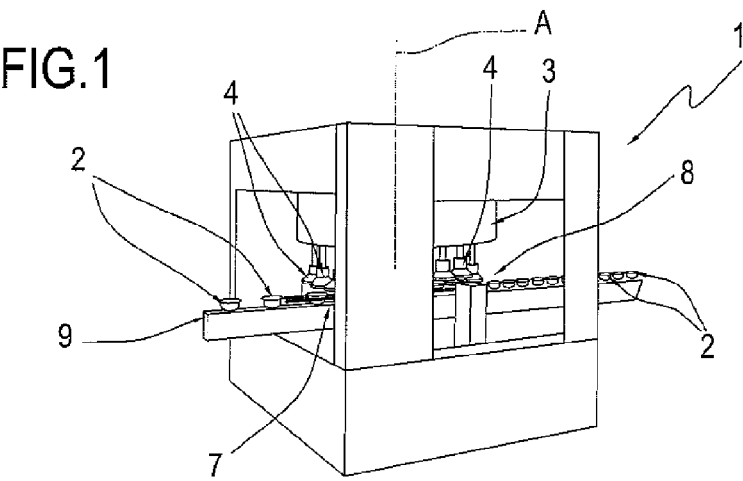
FIG. 1 is a schematic perspective view of a machine made according to this invention.

With reference to the accompanying drawings, the numeral 1 denotes in its entirety a machine according to the invention for checking the condition of containers 2.

The machine 1 comprises a carousel 3 equipped with a plurality of test heads 4, each designed to check the condition of a respective container 2.

Figure 2:
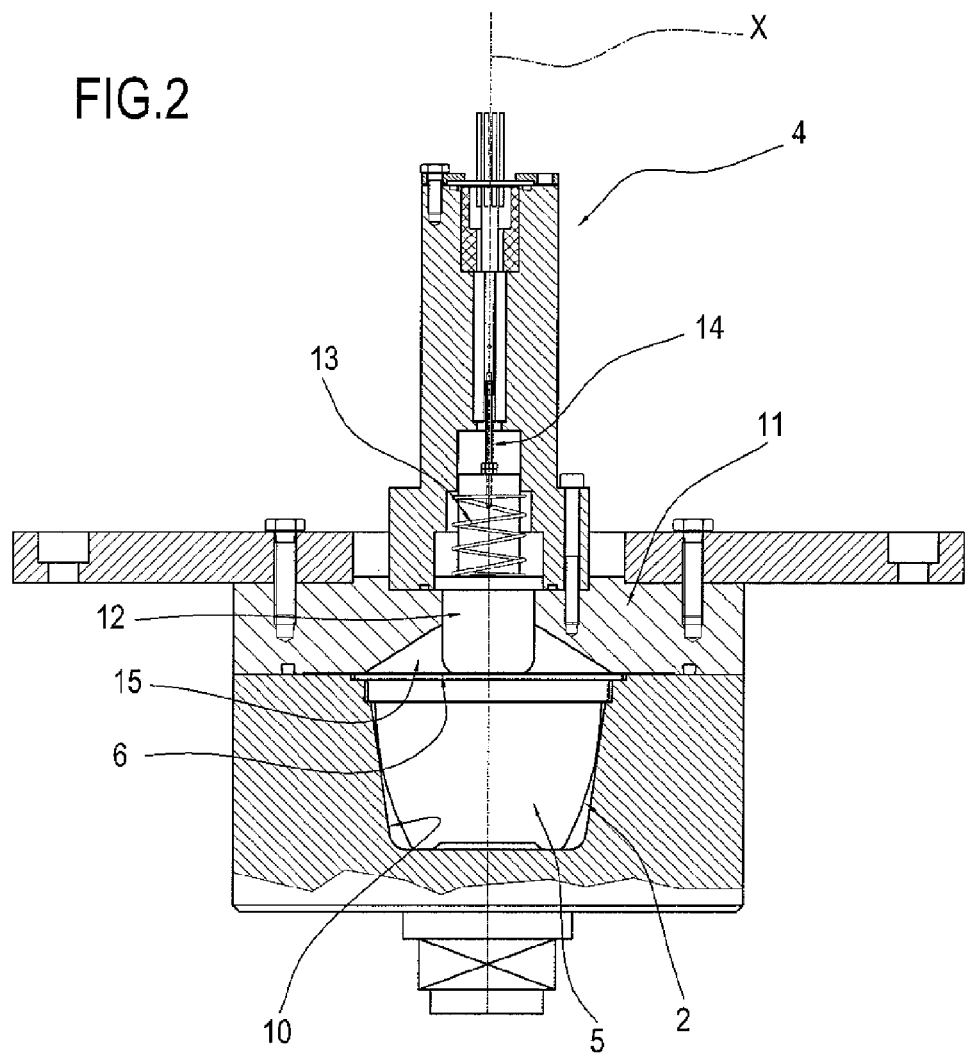
FIG. 2 is schematic cross section showing a test head according to the invention in a first operating configuration.

As shown in FIG. 2, each container 2 comprises a hollow body 5 for containing a semi-liquid or semi-solid product and a membrane 6 for closing the hollow body 5.

This specification hereafter refers to pear pulp as the product inside the container 2 but without thereby restricting the scope of the invention.

The carousel 3 rotates about a defined axis A in such a way as to move the test heads 4 cyclically between an infeed station 7 where the containers 2 are placed one after the other in a respective test head 4, and an outfeed station 8 where the checked containers 2 are taken out of the machine 1.

The carousel 3 is rotationally driven by customary motors that are not illustrated.

A conveyor belt 9 feeds the containers 2 to the carousel 3 at the infeed station 7.

The machine 1 comprises means for positioning the containers inside the test heads 4.

These positioning means are also of customary type and therefore not illustrated or further described.

In the description that follows, no detailed description is provided of the structure of the components of customary type of the machine 1 since they do not fall within the scope of the invention.

Figure 3:
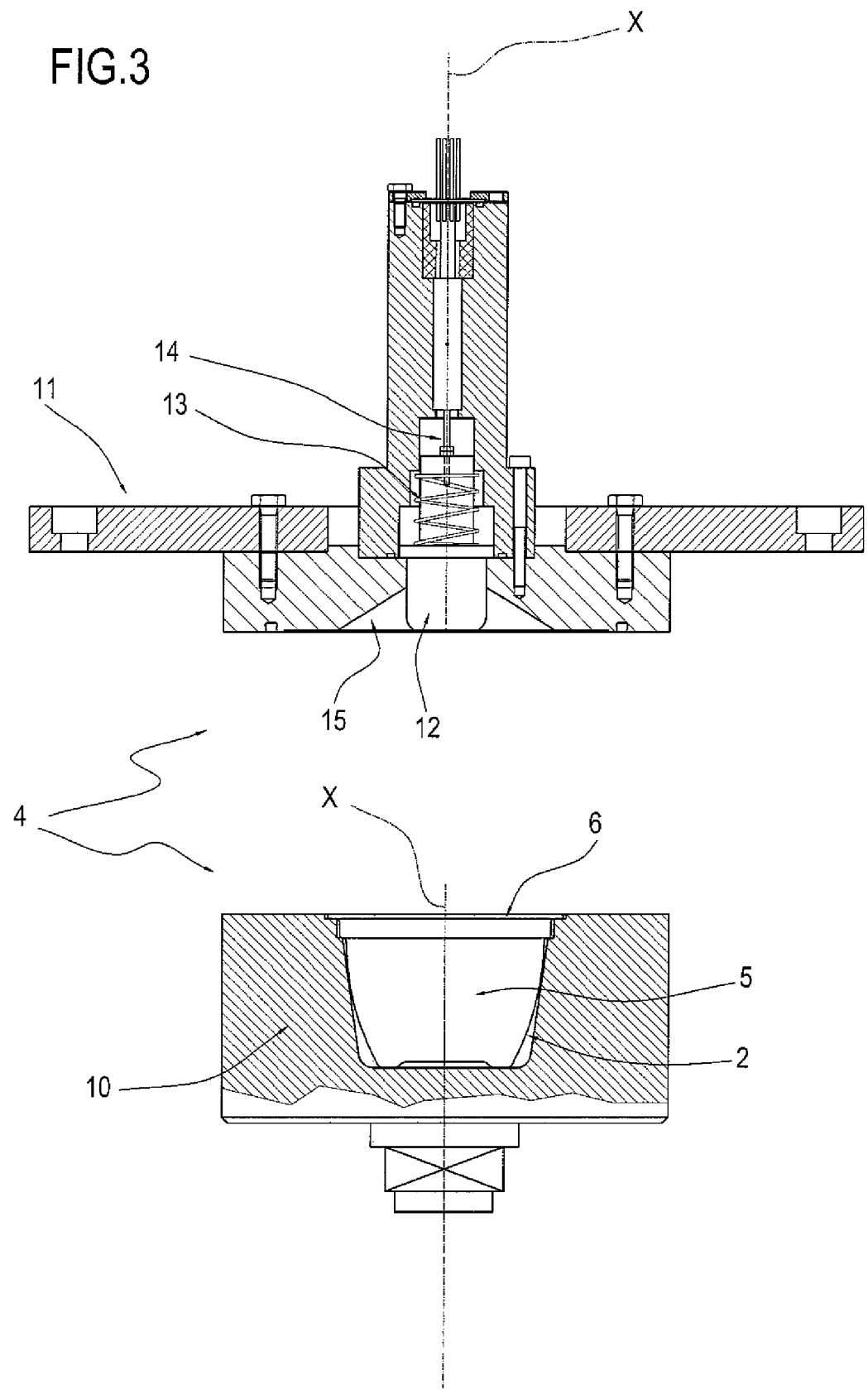
FIG. 3 is schematic cross section showing a test head according to the invention in a second operating configuration.

As illustrated in FIGS. 2 and 3, each test head 4 comprises a housing 10 to hold the container 2 and a cap 11 hermetically sealing the housing 10.

The housing 10 for holding the containers 2 and the cap 11 are aligned along a vertical axis X.

In the embodiment illustrated in the accompanying drawings, the housing 10 is movable vertically along the axis X between a lowered position, shown in FIG. 3, in which it is detached from the cap 11 and a raised sealing position, shown in FIG. 2, where the cap 11 is in contact with the housing 10 and seals it hermetically.

The cap 11 accommodates a detector 12, slidably mounted inside the cap 11 and movable along the vertical axis X.

The detector 12 is held in the lowered position by a spring 13.

In that way, when the cap 11 closes the housing 10, the detector 12 is in contact with the membrane 6 of the container 2.

The detector 12 internally mounts a position sensor 14 designed to detect the vertical movements of the detector 12 in response to the movement of the membrane 6 on the container 2.

Advantageously, the position sensor 14 is an LVDT type sensor.

The cap 11 is shaped in such a way as to form an empty internal space 15 above the housing 10 where the container 2 is positioned.

Figure 4:
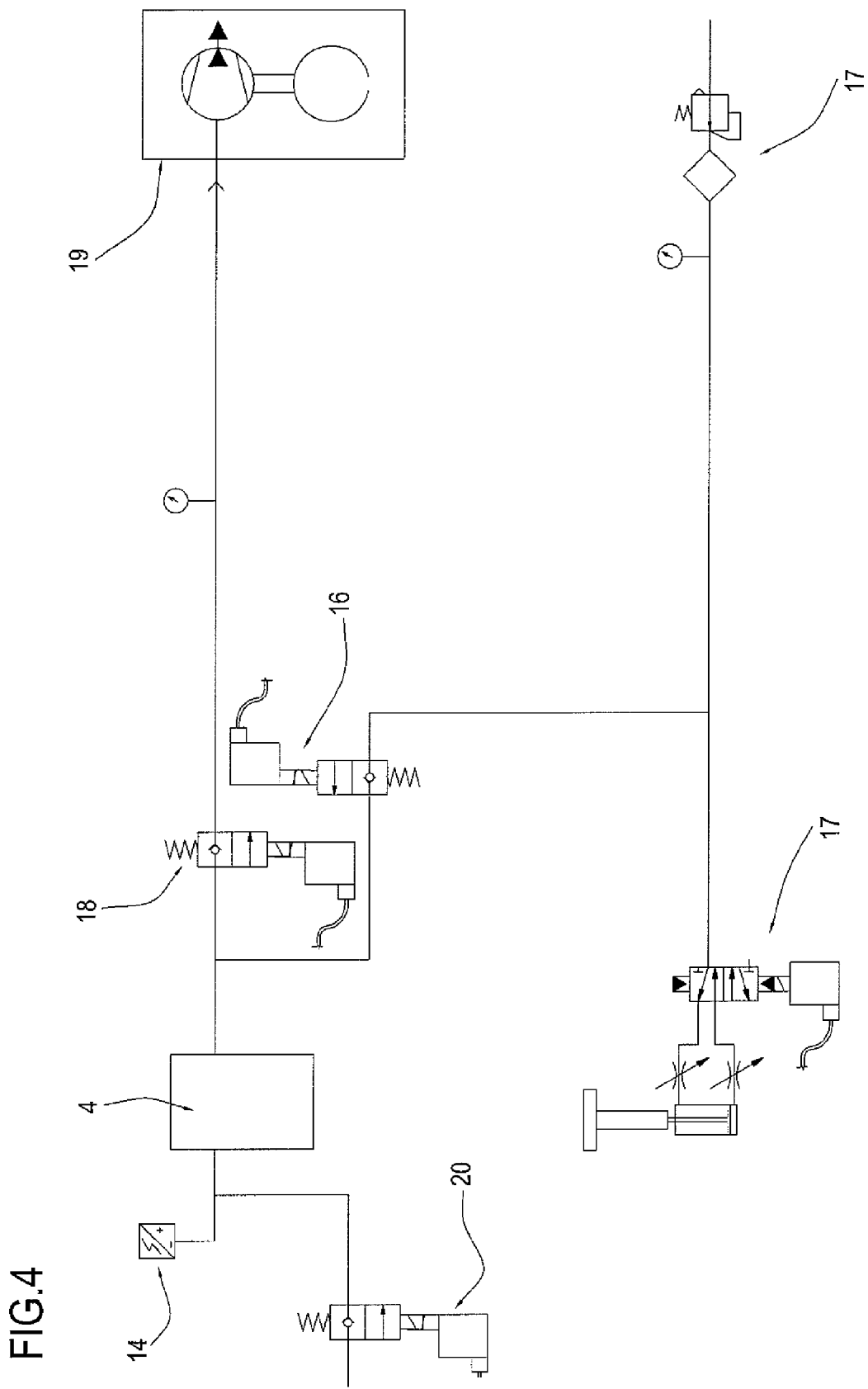
FIG. 4 is a diagram representing the pneumatic circuit associated with the test head of FIGS. 2 and 3.

As illustrated in FIG. 4, the test head 4 has associated with it a pressurization valve 16 connected to means 17 for supplying air under pressure and designed to feed air under pressure into the cap 11.

The test head 4 also comprises a suction valve 18 connected to means 19 for extracting air from the space 15 inside the cap 11 so as to create a vacuum inside the cap 11 itself.

The test head 4 comprises a discharge valve 20 for placing the space 15 inside the cap 11 in fluid communication with the outside atmosphere in order to return the space 15 to atmospheric pressure both after pressurizing and depressurizing the space 15.

In use, the containers 2 are fed to the carousel 3 at the infeed station 7.

Each container 2 is placed by the positioning means (of customary type and therefore not illustrated) in a respective housing 10 in a test head 4.

The housing 10 moves towards the closed position and comes into contact with the cap 11 (position illustrated in FIG. 2): in that way, the container 2 is hermetically sealed inside the head 4 and the detector 12 is in contact with the membrane 6 of the container 2.

At that point, the pressurization valve 16 feeds air under pressure into the space 15 formed by the cap 11 so that the pressure in the space 15 reaches a predetermined, set level.

Figure 5:
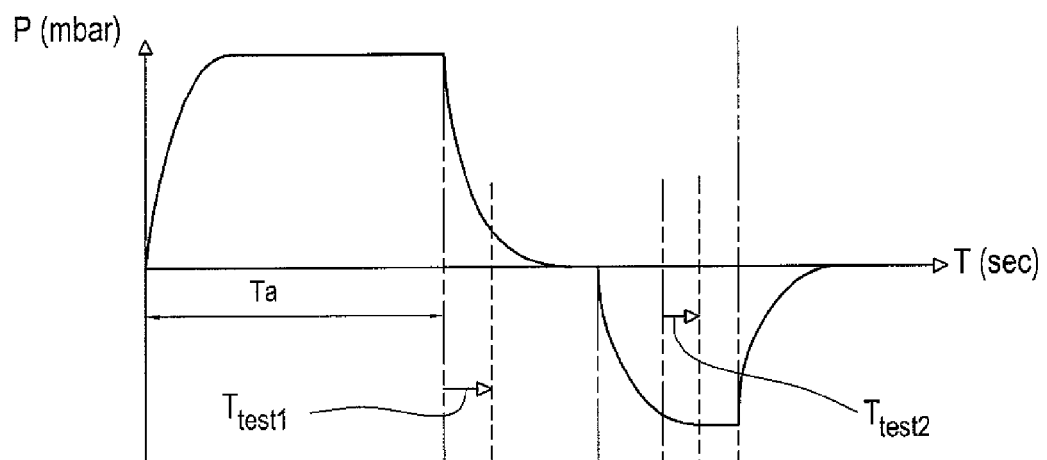
FIG. 5 is a graph showing the test head pressure change over time during the steps of applying the method according to the invention.

The air under pressure is fed into the cap 11 for a defined interval of time Ta shown in the graph of FIG. 5.

A sensor, not illustrated, measures the quantity of air fed into the cap 11.

After the interval of time Ta, the discharge valve 20 is opened and the air under pressure is released from the space 15 inside the cap 11.

The moment the discharge valve 20 is opened, a timer is triggered by a central control unit (neither of which is illustrated) in order to measure a length of time Ttest1 during which the signals from the sensor 14 must be measured.

In effect, as soon as the discharge valve 20 is opened and the timer is triggered, the control unit measures the signal sent by the LVDT sensor 14 and relating to the movement of the membrane 6 on the container 2.

More in detail, after pressurized air is fed into the cap 11 and the discharge valve 20 is opened, one of two situations may occur.

The first is that the membrane 6 is defective or has a medium to small hole in it.

In that case, when pressurized air is fed into the cap 11, a part of the air under pressure is forced into the container 2 through the hole.

When the discharge valve 20 is opened, the pressure in the space 15 inside the cap 11 returns to atmospheric.

The pressurized air that was forced into the container 2 pushes the membrane 6 of the container 2 upwards since the air inside the container 2 is now at a pressure greater than that in the space 15 inside the cap 11 and the hole is too small to allow the hole to escape from inside the container 2 at the same speed at which the air is released from the space 15 in the cap 11 through the discharge valve 20.

In that case, the detector 12 is pushed upwards by the membrane 6 and the LVDT sensor 14 transmits a corresponding movement signal to the control unit.

Figure 6:
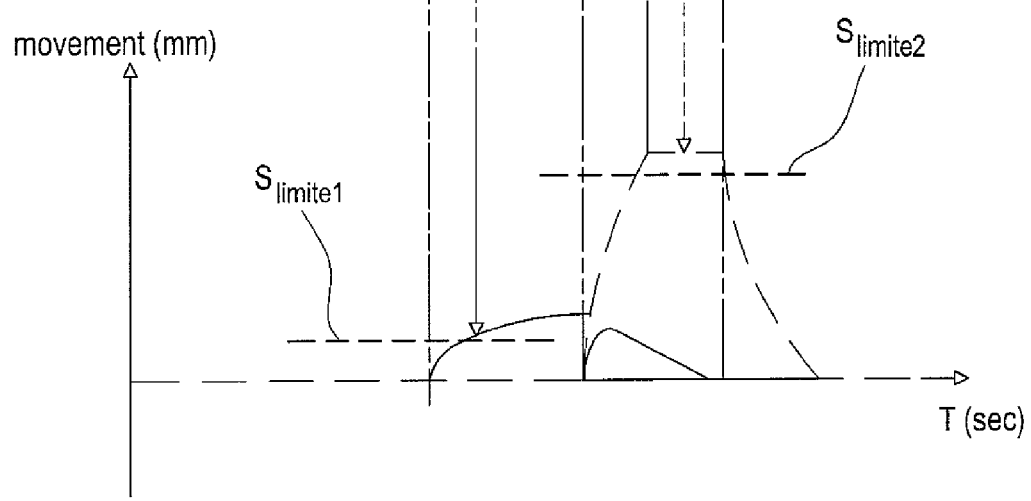
FIG. 6 is a graph showing the movement of the container sealing membrane over time during the steps of applying the method according to the invention.

As illustrated in FIG. 6, if the movement of the membrane 6 during the time interval Ttest1 exceeds a preset threshold value Slimite1 stored in the control unit, then the machine 1 alerts the operator that the container 2 is faulty and must be rejected.

In the second case, where the container 2 does not have medium or small holes in it, the membrane 6 either does not move at all or its movement (dashed line in FIG. 6) remains under the preset threshold Slimite1 and the container can be subjected to further tests.

Advantageously, blowing air under pressure according to the method of the invention eliminates the risk of not detecting the hole if the semi-solid product inside the container 2 obstructs the hole in the membrane 6, because the air under pressure quickly and easily pushes the product out of the hole and into the container 2.

After these pressurizing, releasing and measuring steps, the suction valve 18 is opened and the air extraction means 19 activated.

The valve 18 extracts air from the space 15 inside the cap 11 for a defined time interval Tv in order to create in the space 15 a predetermined negative pressure.

If the set negative pressure level is not reached within the time interval Tv, then the machine 1 registers an error. In effect, there are two reasons why the preset negative pressure level is not reached: either the cap 11 is faulty and does not hermetically seal the container 2 or the membrane 6 of the container 2 has such a large hole in it that the amount of air removed by the extraction means 19 in the time interval Tv is compensated by the air inside the space 15 in the cap 11 plus the air inside the container 2, both subjected to the extraction means.

If the required negative pressure level has been reached in the space 15 at the end of the time interval Tv, a timer is triggered to measure a length of time Ttest2 and, at the same time, the LVDT sensor 14 connected to the control unit starts measuring the movement of the membrane 6.

Even under negative pressure conditions, two situations may occur (illustrated in FIG. 6).

The first is where the membrane 6 has a medium to large hole in it.

In that case, extracting air from inside the cap 11 does cause any movement of the membrane 6.

That is because a large hole or tear in the membrane 6 causes air to be sucked back into the container 2 without having any effect on the membrane 6.

If, as in the case of a large hole, the movement of the membrane 6 detected by the sensor 14 remains below a preset threshold value Slimite2 (unbroken line in FIG. 6 relating to the extraction section), then the machine 1 registers the non-conformity of the container 2, which must therefore be rejected.

If the container 2 does not have any large holes in it, during depressurization and measurement of membrane 6 movement, the membrane movement detected by the sensor 14 remains above the preset threshold value Slimite2, as shown by the dashed line in FIG. 6, which means that the container 2 is in good condition.

At the end of the depressurization step, the discharge valve 20 is opened and the space 15 in the cap 11 is returned to atmospheric pressure.

Once the container 2 has undergone both the pressurization-depressurization cycles and the respective measurements, the test is over and if the result of both cycles is positive, the container 2 may be considered in good condition.

In another embodiment of the invention, the order of the test cycles described above is reversed.

More in detail, the depressurization and measurement cycle is carried out first, followed by the pressurization and measurement cycle.

Further, if that order is followed, the discharge step following depressurization might be omitted since air under pressure is in any case fed into the cap after depressurization.

The invention has important advantages.

The combination of the two cycles makes it possible to effectively and reliably test containers containing viscous, semi-liquid or semi-solid products and the like.

In effect, the test method makes it possible to detect medium to small holes even if the hole is obstructed by the viscous product inside the container since the obstructed hole is cleared by the air under pressure.

Also, the combination of the two test cycles makes it possible to effectively check all kinds of containers for all possible sealing membrane faults.

The invention described has evident industrial applications and can be modified and adapted in several ways without thereby departing from the scope of the inventive concept. Moreover, all details of the invention may be substituted by technically equivalent elements.

What is claimed is:

1. A method for checking a condition of a container comprising a hollow body for containing a semi-liquid or semi-solid product and a membrane for closing the hollow body, the method comprising:
   closing the container inside a test head comprising a housing to hold the container and a cap hermetically sealing the container and defining an empty internal space;
   pressurizing the space inside the cap by introduction of pressurized air inside the space, for a first defined period of time;
   releasing the air from the space;
   measuring a movement of the membrane due to the pressurization of the space with a position sensor;
   depressurizing the space for a second defined period of time, using a mechanism for extracting the air from inside the space;
   measuring a movement of the membrane due to the depressurization of the space with the position sensor;
   starting a timer simultaneously with starting the releasing the pressurized air from the space.

2. The method according to claim 1, wherein the measuring the movement of the membrane due to the pressurization of the space starts simultaneously with starting the releasing the pressurized air from the space.

3. The method according to claim 2, wherein the measuring the movement of the membrane is carried out for a third defined period of time, timed by the timer and comprises comparing the movement of the membrane with a first defined threshold value, during the third period of time.

4. The method according to claim 1, wherein the measuring the movement of the membrane due to the depressurization of the space starts during the depressurizing the space.

5. The method according to claim 4, wherein the measuring the movement of the membrane due to the depressurization of the space only starts if a pre-set negative pressure level has been reached.

6. The method according to claim 4, comprising starting a timer simultaneously with the starting of the measuring the movement of the membrane due to the depressurization of the space.

7. The method according to claim 6, wherein the measuring the movement of the membrane due to the depressurization of the space is carried out for a fourth defined period of time timed by the timer and comprises comparing the movement with a second defined threshold value, during the fourth defined period of time.

8. The method according to claim 1, wherein the measuring the movement of the membrane is carried out with an LVDT sensor.

9. A method for checking a condition of a container comprising a hollow body for containing a semi-liquid or semi-solid product and a membrane for closing the hollow body, the method comprising:
   closing the container inside a test head comprising a housing to hold the container and a cap hermetically sealing the container and defining an empty internal space;
   pressurizing the space inside the cap by introduction of pressurized air inside the space, for a first defined period of time;
   releasing the air from the space;
   measuring a movement of the membrane due to the pressurization of the space with a position sensor;
   depressurizing the space for a second defined period of time, using a mechanism for extracting the air from inside the space;
   measuring a movement of the membrane due to the depressurization of the space with the position sensor;
   wherein the measuring the movement of the membrane due to the depressurization of the space starts during the depressurizing the space;
   wherein the measuring the movement of the membrane due to the depressurization of the space only starts if a pre-set negative pressure level has been reached.

10. The method according to claim 9, wherein the measuring the movement of the membrane is carried out for a third defined period of time, timed by a timer and comprises comparing the movement of the membrane with a first defined threshold value, during the third period of time.

11. The method according to claim 10, comprising starting the timer simultaneously with the starting of the measuring the movement of the membrane due to the depressurization of the space.

12. The method according to claim 11, wherein the measuring the movement of the membrane is carried out with an LVDT sensor.

13. A method for checking a condition of a container comprising a hollow body for containing a semi-liquid or semi-solid product and a membrane for closing the hollow body, the method comprising:
- closing the container inside a test head comprising a housing to hold the container and a cap hermetically sealing the container and defining an empty internal space;
- pressurizing the space inside the cap by introduction of pressurized air inside the space, for a first defined period of time;
- releasing the air from the space;
- measuring a movement of the membrane due to the pressurization of the space with a position sensor;
- depressurizing the space for a second defined period of time, using a mechanism for extracting the air from inside the space;
- measuring a movement of the membrane due to the depressurization of the space with the position sensor;
- wherein the measuring the movement of the membrane due to the depressurization of the space starts during the depressurizing the space;
- starting a timer simultaneously with the starting of the measuring the movement of the membrane due to the depressurization of the space.

14. The method according to claim 13, wherein the measuring the movement of the membrane is carried out for a third defined period of time, timed by the timer and comprises comparing the movement of the membrane with a first defined threshold value, during the third period of time.

15. The method according to claim 14, wherein the measuring the movement of the membrane is carried out with an LVDT sensor.

* * * * *